(12) United States Patent
Meyrenaud et al.

(10) Patent No.: US 10,166,910 B2
(45) Date of Patent: Jan. 1, 2019

(54) AUTOMOTIVE LIGHTING MODULE WITH COMBINED LOW AND HIGH BEAM FUNCTIONS AND AN ADJUSTABLE LIGHT SOURCE

(71) Applicant: VALEO VISION, Bobigny (FR)

(72) Inventors: Jean-Luc Meyrenaud, Livry Gargan (FR); Antoine De-Lamberterie, Paris (FR)

(73) Assignee: VALEO VISION, Bobigny (FR)

( * ) Notice: Subject to any disclaimer, the term of this patent is extended or adjusted under 35 U.S.C. 154(b) by 53 days.

(21) Appl. No.: 15/374,431

(22) Filed: Dec. 9, 2016

(65) Prior Publication Data

US 2017/0166109 A1 Jun. 15, 2017

(30) Foreign Application Priority Data

Dec. 10, 2015 (FR) ...................................... 15 62118

(51) Int. Cl.
*B60Q 1/14* (2006.01)
*F21S 41/147* (2018.01)
(Continued)

(52) U.S. Cl.
CPC .............. *B60Q 1/14* (2013.01); *F21S 41/147* (2018.01); *F21S 41/285* (2018.01); *F21S 41/32* (2018.01);
(Continued)

(58) Field of Classification Search
CPC ...... B60Q 1/14; B60Q 1/1407; B60Q 1/1415; B60Q 1/1423; F21S 41/663; F21S 41/147;
(Continued)

(56) References Cited

U.S. PATENT DOCUMENTS 7,993,043 B2 * 8/2011 Sazuka ..................... B60Q 1/14
362/509
8,545,073 B2 * 10/2013 Meyrenaud ........... F21S 41/147
362/545
(Continued)

FOREIGN PATENT DOCUMENTS

DE   10 2011 087 309 A1   5/2013
EP    2 058 585 A2        5/2009
(Continued)

OTHER PUBLICATIONS

Christophe Le Dall, Oct. 25, 2013, Patent Translate Powered by EPO and Google, Description FR2989647, pp. 1-7.*
(Continued)

*Primary Examiner* — Alan B Cariaso
(74) *Attorney, Agent, or Firm* — Oblon, McClelland, Maier & Neustadt, L.L.P.

(57) ABSTRACT

A motor vehicle lighting module including an optical axis, a first optical system with at least one first light source, the system being configured to form a first lighting beam along the optical axis, with a horizontal cutoff; and a second optical system with at least one second light source, the system being configured to produce, in combination with the first optical system, a second lighting beam along the optical axis, that is vertically more extensive than the first beam. The light sources have a variable lighting power varying between a high level and a low level, the first beam being produced at the low level of lighting power and the second beam being produced at the high level of lighting power.

16 Claims, 2 Drawing Sheets

(51) Int. Cl.
  *F21S 41/20* (2018.01)
  *F21S 41/36* (2018.01)
  *F21S 41/32* (2018.01)
  *F21S 41/663* (2018.01)
  *F21S 41/365* (2018.01)

(52) U.S. Cl.
  CPC ............. *F21S 41/321* (2018.01); *F21S 41/36* (2018.01); *F21S 41/663* (2018.01); *F21S 41/365* (2018.01)

(58) Field of Classification Search
  CPC ........ F21S 41/148; F21S 41/25; F21S 41/255; F21S 41/285; F21S 41/321; F21S 41/36; F21S 48/1159
  See application file for complete search history.

(56) References Cited

U.S. PATENT DOCUMENTS

| | | | |
|---|---|---|---|
| 2005/0068787 A1* | 3/2005 | Ishida | B60Q 1/14 362/538 |
| 2007/0279924 A1* | 12/2007 | Yagi | F21S 41/147 362/509 |
| 2008/0055896 A1 | 3/2008 | Feldmeier | |
| 2012/0039083 A1 | 2/2012 | Meyrenaud | |
| 2014/0098517 A1 | 4/2014 | Chen | |
| 2016/0186952 A1* | 6/2016 | Hogrefe | F21S 41/147 362/509 |
| 2017/0023200 A1* | 1/2017 | Clement | F21S 48/1172 |
| 2017/0059110 A1* | 3/2017 | Reiss | B60Q 1/28 |

FOREIGN PATENT DOCUMENTS

| | | |
|---|---|---|
| EP | 2 159 479 A2 | 3/2010 |
| FR | 2 944 578 A1 | 10/2010 |
| FR | 2 989 647 A1 | 10/2013 |
| JP | 2011-124100 A | 6/2011 |

OTHER PUBLICATIONS

Christophe Le Dall, Oct. 25, 2013, Patent Translate Powered by EPO and Google, Claims FR2989647, pp. 1-2.*
French Preliminary Search Report dated Sep. 6, 2016 in French Patent Application No. 1562118 (with English translation of categories of cited documents).

* cited by examiner

AUTOMOTIVE LIGHTING MODULE WITH COMBINED LOW AND HIGH BEAM FUNCTIONS AND AN ADJUSTABLE LIGHT SOURCE

BACKGROUND OF THE INVENTION

Field of the Invention

The invention relates to the field of lighting, notably for motor vehicles. More particularly, the invention relates to the field of motor vehicle headlamps.

Published patent document US 2005/0068787 A1 discloses a lighting module comprising two optical systems arranged opposite each other. Each of these two optical systems essentially comprises a light source and reflective surface. These two light sources are arranged on two opposite faces of a common support. Each of the reflective surfaces is a surface of revolution in a half-space delimited by the common support. The two reflective surfaces thus form two half-shells opposing one another. One of the two optical systems is configured to form a lighting beam with a horizontal cutoff, corresponding to what is referred to as a "low beam". To do that, the module comprises a reflective surface with an edge referred to as a "cutoff" edge situated at a focal point of the reflective surface. The rays striking the surface in question to the rear of the cutoff edge are reflected toward an upper part of a projection lens whereas those passing in front of the edge in question are not deflected and strike a lower part of the lens in question. This phenomenon ensures an essentially horizontal beam cutoff. The other of the two optical systems operates in essentially the same way, except that its configuration is symmetric with that of the first system. The beam produced by the second optical system is combined with that of the first system to produce a lighting beam of the "high beam" type, namely a beam with no horizontal cutoff. This configuration is advantageous in that it uses the cutoff beam to produce a beam of the "high beam" type. Nevertheless, it may exhibit photometric difficulties in the lower part of the beam of "high beam" type given that it is produced essentially using the cutoff beam of "low beam" type.

Published patent document US 2007/0279924 A1 discloses a motor vehicle lighting module comprising a light source with several light zones that can be powered separately. It also comprises a reflective surface forming a half-shell, in a similar way to the reflective surfaces of the earlier teaching. The image produced with the lighting beam varies according to which light zones are powered. A beam that is limited vertically and spread horizontally may be produced, as may a beam that is more extensive vertically but more limited horizontally. This teaching is advantageous in that the shape of the beam can be modulated using the light source.

BRIEF SUMMARY OF THE INVENTION

It is an objective of the invention to alleviate at least one of the disadvantages of the prior art, particularly that of the aforementioned prior art. More specifically, it is an objective of the invention to propose a high-performance lighting module capable of producing a beam with a cutoff and, in combination with the cutoff beam, a beam that has no cutoff.

One subject of the invention is a motor vehicle lighting module comprising: an optical axis, a first optical system with at least one first light source, said system being configured to form a first lighting beam along the optical axis, with a horizontal cutoff, a second optical system with at least one second light source, said system being configured to produce, in combination with the first optical system, a second lighting beam along the optical axis, that is vertically more extensive than the first beam, notable in that the light sources have a variable lighting power varying between a high level and a low level, the first beam being produced at the low level of lighting power and the second beam being produced at the high level of lighting power.

The first beam is advantageously a beam referred to as "low beam". The second beam is advantageously a beam referred to as "high beam".

The variation in lighting power of the first light source or sources can be achieved by varying the current electrically powering said source or sources and/or by selectively powering light zones of said source or sources.

According to one advantageous embodiment of the invention, where the first light source or sources comprise at least one main light zone and at least one auxiliary light zone, said main and auxiliary zone(s) being able to be electrically powered separately, the low level of lighting power being produced by powering the main zone or zones only and the high level of power being produced by powering the main and auxiliary zone(s).

According to one advantageous embodiment of the invention, the main and auxiliary light zone(s) of the or each of the first light sources are arranged on one and the same component.

According to one advantageous embodiment of the invention, the main and auxiliary light zone(s) of the or each of the first light sources are arranged on several components.

According to one advantageous embodiment of the invention, the auxiliary light zone(s) of the or of each of the first light sources are arranged, along the optical axis, forward of the main light zone or zones. The idea of "forward" is to be understood in the general direction in which the rays of light travel.

According to one advantageous embodiment of the invention, the high level of lighting power is greater than or equal to 150% of the low level.

According to one advantageous embodiment of the invention, the second beam has a mean light flux in a zone which is greater than or equal to 150% of the mean light flux of the first beam in the zone, said zone being situated beneath the optical axis. The zone in question may extend vertically over a 3% downward gradient starting from the optical axis and/or horizontally over a 10% gradient on each side of the optical axis.

According to one advantageous embodiment of the invention, the first light source or sources are arranged in such a way as to illuminate in a first direction, the second light source or sources being arranged in such a way as to illuminate in a second direction which is the opposite of the first direction.

According to one advantageous embodiment of the invention, the first light source or sources and the second light source or sources are arranged on opposite faces of a common support.

According to one advantageous embodiment of the invention, each of the first and second optical systems comprises a reflective surface able to reflect the rays emitted by the first and/or second light source or sources, respectively, toward a cutoff edge situated on the optical axis of the module.

According to one advantageous embodiment of the invention, the reflective surface of the first and/or of the second optical system has the shape of a half-shell, preferably with an elliptical profile.

According to one advantageous embodiment of the invention, the module comprises an electronic control unit controlling the first and second light source(s), and configured to power the first light source or sources at the low level to form the first beam and to power the second light source or sources to form the second beam at the high level of lighting power without at least one main and auxiliary zone(s).

According to one advantageous embodiment of the invention, the first light sources are two in number, arranged respectively one on each side of the optical axis of the module.

According to one advantageous embodiment of the invention, the reflective surface of the first optical system comprises two portions of a surface of revolution about two optical axes of said optical system, said axes converging toward the optical axis of the module.

According to one advantageous embodiment of the invention, the main light zone or zones of each of the two first light sources are centered on one of the two optical axes of the first optical system respectively, and the auxiliary light zones are arranged laterally to said corresponding optical axis on the side of the optical axis of the module and forward of the main light zones.

According to one advantageous embodiment of the invention, the main light zones of each of the two first light sources are aligned in a first direction perpendicular to the corresponding optical axis of the first optical system.

According to one advantageous embodiment of the invention, the auxiliary light zones of each of the two first light sources are aligned in a second direction perpendicular to the corresponding optical axis of the first optical system, said second direction being situated forward of the corresponding first perpendicular direction. The distance d between the first and second perpendicular directions may be comprised between 0.5 and 3 mm, preferably between 1 and 2 mm.

According to one advantageous embodiment of the invention, the module comprises a lens configured to receive rays of light from the first and second optical systems in order to form the first and second beams.

Another subject of the invention may be a headlamp comprising a module according to the invention.

The measures taken by the invention are advantageous in that they make it possible to produce, in addition to a first beam with a cutoff, a second beam without a cutoff and with a higher light flux, and to do so using the first optical system.

Further features and advantages of the present invention will be better understood with the aid of the description and of the drawings among which:

BRIEF DESCRIPTION OF THE DRAWINGS

Further features and advantages of the present invention will be better understood with the aid of the description and of the drawings among which:

FIG. 1 is a schematic depiction of a lighting module according to the invention. The module 2 comprises an optical axis 4, a first optical system 6, a second optical system 20 and a lens 18. The first and second optical systems 6 and 20 are opposite one another, one on each side of the optical axis 4.

Figure 1:
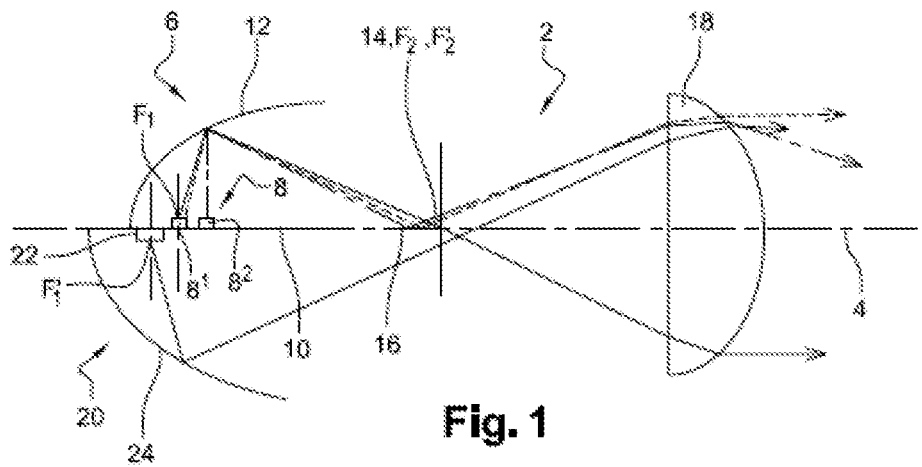
FIG. 1 is a schematic diagram of a lighting module according to a first embodiment of the invention.

The first optical system 6 essentially comprises a light source 8 arranged on a support 10, and a reflective surface 12. The latter forms a half-shell in the half-space delimited by the support 10. The latter is advantageously generally planar. The reflective surface 12 advantageously has an elliptical profile with two focal points $F_1$ and $F_2$, one them ($F_1$) corresponding to the location of the light source 8 and the other ($F_2$) being at the level of a cutoff edge 14 of a reflective surface 16.

The second optical system 20 essentially, and like the first optical system 6, comprises a light source 22 arranged on the support 10 which is advantageously common to the first light source 8, and a reflective surface 24. The latter forms a half-shell in the half-space delimited by the support 10 and is advantageously elliptical in profile with two focal points $F_1'$ and $F_2'$, one of them ($F_1'$) corresponding to the location of the light source 22 and the other ($F_2'$) being level with the cutoff edge 14 of the reflective surface 16. The focal point $F_2'$ of the second optical system 20 may coincide with that ($F_2$) of the first optical system 6.

The reflective surfaces 12 and 24 of the first and second optical systems 6 and 20 may be surfaces of revolution configured to reflect the rays emitted in the two half-spaces delimited by the support 10 toward the focal points $F_2$ and $F_2'$.

With reference to FIG. 1, it may be seen that the first light source 8 comprises several light zones $8^1$ and $8^2$ which are distinct from one another. In this particular instance, the main light zone or zones $8^1$ are arranged at the level of the first focal point $F_1$ whereas the auxiliary light zone or zones $8^2$ are arranged forward, in the direction of the optical axis and the overall direction in which the rays travel, of the zone or zones $8^1$ situated at the focal point $F_1$.

Figure 2:
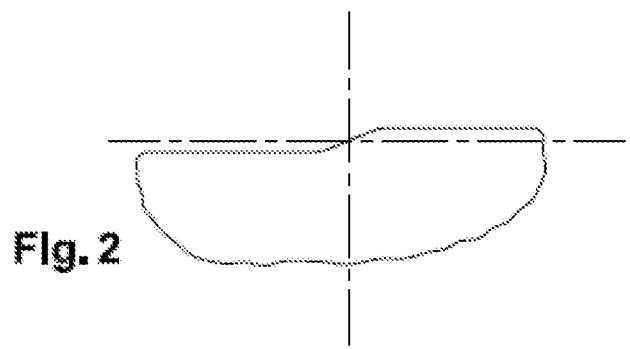
FIG. 2 illustrates the image of a beam with a horizontal cutoff produced by the module of FIG. 1.

The module works as follows:

When the main light zone or zones $8^1$ of the light source 8 of the first optical system is/are electrically powered, the rays produced are essentially reflected toward the second focal point $F_2$. Some of the rays pass directly forward of the cutoff edge 14 and strike the lower half of the lens 18. These rays are then refracted a first time as they pass through the first diopter formed by the rear face of the lens and then a second time as they pass through the second diopter formed by the front face of said lens. These rays are illustrated by the ray depicted in continuous line in FIG. 1. Others of the rays strike the reflective surface 16 at the rear of the cutoff edge 14 and are reflected toward the upper half of the lens 18. These rays are then refracted a first time as they pass through the first diopter of the lens and then a second time as they pass through the second diopter. These rays, were they not reflected by the upper half of the lens, would strike the lower half of the lens in such a way that they would be refracted toward the top of the beam on exiting the lens. The fact that they are reflected using the reflective surface 16 creates an essentially horizontal beam cutoff. This phenomenon is well known in itself to those skilled in the art. These rays are illustrated by the rays depicted in broken line. A beam with an image as depicted in FIG. 2 is therefore produced. It may be seen that this beam has an essentially horizontal cutoff, the zone situated above the cutoff in question being illuminated very little if at all, whereas the zone situated below said cutoff is illuminated.

Figure 3:
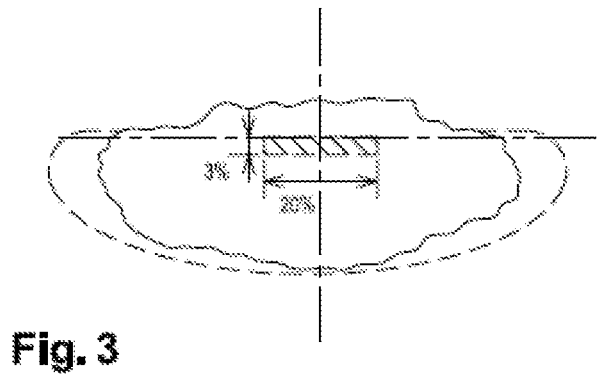
FIG. 3 illustrates the image of a beam without a horizontal cutoff produced by the module of FIG. 1.

When the light source 22 of the second optical system is electrically powered, a beam that complements the beam of the first optical system is produced. When the light source 22 of the second optical system is electrically powered at the same time as the main light zones 8¹ of the first optical system, a beam like the one illustrated in continuous line in FIG. 3 is produced. In order to achieve photometric values desired for a lighting function of the "high beam" type, the auxiliary light zones 8² of the light source 8 of the first optical system 6 are also electrically powered. The beam produced by the first optical system 6 is then more intense from a photometric viewpoint and therefore makes it possible to produce a lighting beam that corresponds to the image depicted in broken line in FIG. 3. This beam is not only broader, notably in its lower part, but also more intense than the beam produced with both optical systems 6 and 20 when only the main light zones 8¹ of the first system 6 are powered. The increase in light intensity is advantageously concentrated in the shaded zone in FIG. 3, the height of which corresponds to a 3% downward gradient measured from the horizontal and the width of which corresponds to a 20% gradient. The mean light flux in this zone may increase from 120 Lm to 170 Lm. The increase in this zone is advantageously greater than or equal to 50%.

With reference to FIG. 1, the auxiliary light zone or zones 8² (which are powered only in combination with that (those) of the second optical system 20) are advantageously arranged, in the direction of the optical axis and in the direction in which the rays of light travel, forward of the main light zones 8¹. The path followed by a ray from one of the auxiliary light zones 8² is illustrated in broken line in FIG. 1. It may be seen that the ray emitted by the light zone 8², after reflecting off the reflective surface 12, strikes the reflective surface 16 at the rear of the cutoff edge 14 and is reflected toward the upper half of the lens 18. It strikes the lens 18 at an angle of incidence that is smaller than that of the corresponding ray, likewise in broken line, coming from one of the main light zones 8¹. The ray coming from the auxiliary light zone 8², situated forward of the main light zones 8¹, leaves the lens 18 in a downward directed direction. The fact that the auxiliary light zone or zones is or are positioned forward of the main light zone or zones, more particularly forward of the first focal point $F_1$ thus makes it possible to increase the light intensity near the horizontal cutoff, in the lower part of the beam produced.

Figure 4:
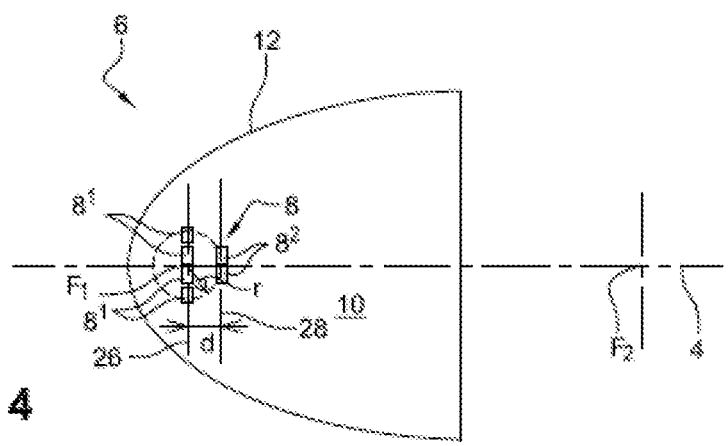
FIG. 4 is a schematic view in elevation of the upper light zones of the module of FIG. 1.

FIG. 4 is a view in elevation of the upper face of the support 10 of the light source 8 of the first optical system 6 of FIG. 1. It may be seen that the light source 8 comprises four main light zones 8¹ arranged in a first direction 26 perpendicular to the optical axis 4. The auxiliary light zones 8² are two in number and are also arranged in a second direction 28 perpendicular to the optical axis 4, this direction being situated forward of the first perpendicular direction 26. The distance d between these two perpendicular directions 26 and 28 may be comprised between 0.5 and 3 mm, preferably between 1 and 2 mm. Still with reference to FIG. 4, it may be seen that the distance d in question corresponds to the radius r of a circle centered on the first focal point $F_1$ and through which the second perpendicular direction 28 passes. The main light zones 8¹ are advantageously spread in the first perpendicular direction 26 over the diameter 2r of the circle. This arrangement is particularly advantageous from an optical standpoint because the main light zones 8¹, by being aligned in the perpendicular direction 26 passing through the first focal point $F_1$ ensure that the rays produced are concentrated toward the cutoff edge at the second focal point $F_2$ and, as a result, ensure a beam that is uniform with a clear-cut horizontal cutoff.

Figure 5:
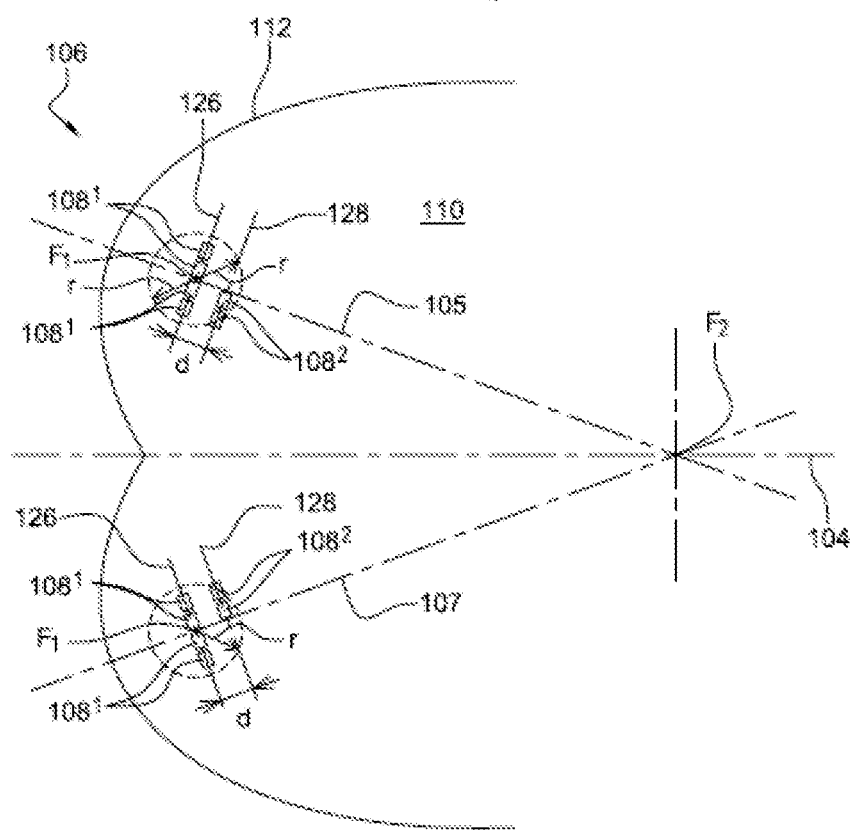
FIG. 5 is a schematic view in elevation of the upper light zones of a lighting module according to a second embodiment of the invention.

FIG. 5 is a depiction similar to that of FIG. 4 of a configuration of the first optical system of the module of FIG. 1 according to a second embodiment of the invention. The reference numerals of the first embodiment according to FIGS. 1 to 4 are used for elements that are the same or corresponding, these numbers however being increased by 100. Reference is also made to the description given of these elements in the context of the first embodiment. Specific reference numerals comprised between 100 and 200 are used for the elements which are specific.

The first optical system 106 illustrated in FIG. 5 comprises two light sources 108 arranged laterally one on each side of the optical axis 104 of the module. These light sources 108 are arranged in such a way that their rays of light converge toward the second focal point $F_2$ on the optical axis 104 of the module. To achieve that, the reflective surface 112 forms two surface portions in the shape of half-shells, preferably with an elliptical profile having two focal points $F_1$ and $F_2$. The two surface portions are advantageously surface portions of revolution about the optical axes 105 and 107 of the optical system 106, said axes converging toward the second focal point $F_2$. Each of the two light sources 108 is arranged at the first focal point $F_1$ on the corresponding optical axis 105 and 107. A lens similar to the lens 10 in FIG. 1 is placed forward of the second focal point $F_2$, more specifically so that its focal point corresponds to the focal point $F_2$ in question.

Like the light source 8 in the first embodiment, the light sources 108 each comprise main light zones 108¹ and auxiliary light zones 108². Like the configuration in the first embodiment illustrated in FIG. 5, the main light zones 108¹ may be aligned in a first direction 126 perpendicular to the corresponding optical axis 105 or 107. Again like the first embodiment, the auxiliary light zones 108² may be arranged forward of the main light zones 108¹, preferably aligned in a second direction 128 perpendicular to the corresponding optical axis. In this particular instance, the auxiliary light zones 108² are two in number and the main light zones 108¹ are four in number, this being for each of the two light sources 108. It must of course be understood that these numbers may vary. It is advantageous to note that the auxiliary light zones 108² are arranged laterally with respect to the corresponding optical axis 105 or 107, on the side of the optical axis 104 of the module. This configuration is advantageous in that this lateral offsetting of the auxiliary light zones 108² allows the rays to be concentrated horizontally toward the middle of the beam.

The distance d between the two perpendicular directions 126 and 128 may be comprised between 0.5 and 3 mm, preferably between 1 and 2 mm. It may be seen in FIG. 5 that the distance d in question corresponds to the radius r of a circle centered on each of the first focal points $F_1$ and through which the second perpendicular direction 128 passes. The main light zones 108¹ are advantageously distributed in the first perpendicular direction 126 on the diameter 2r of the circle.

In general, the light zones of the light source or sources of the first optical system may be situated on one and the same semiconductor component, these zones then being addressable from an activation standpoint, so that they can be powered individually. Alternatively, these zones may correspond to several distinct semiconductor components, in which case these components are powered individually, for example by means of electrically conducting tracks on a plate that these components share in common.

Still in general terms, a control unit (not depicted) is advantageously electrically connected to the light sources of the first and second optical systems and configured to power only the main light zones of the first source or sources in order to produce the beam with a horizontal cutoff and all the light zones of the first source or sources as well as the second source in order to produce the beam without a horizontal cutoff.

The invention claimed is:

1. A motor vehicle lighting module, comprising:
   an optical axis;
   a first optical system with at least one first light source, said first optical system being configured to form a first lighting beam along the optical axis, with a horizontal cutoff;
   a second optical system with at least one second light source, said second optical system being configured to produce, in combination with the first optical system, a second lighting beam along the optical axis, that is vertically more extensive than the first beam;
   wherein-the at least one first light source has a variable lighting power varying between a high level and a low level and the at least one second light source has a lighting power at the high level, the first beam being produced at the low level of lighting power and the second beam being produced at the high level,
   wherein the at least one first light source comprises at least one main light zone and at least one auxiliary light zone, said at least one main light zone and said at least one auxiliary light zone to be electrically powered separately, the low level of lighting power being produced by only powering said at least one main light zone and the high level of power being produced by powering said at least one main light zone and said at least one auxiliary light zone, and said at least one main light zone and said at least one auxiliary light zone of each of the at least one first light source are arranged on several components.

2. The lighting module according to claim 1, wherein said at least one auxiliary light zone of each of the at least one first light source are arranged, along the optical axis, forward of said at least one main light zone.

3. The lighting module according to claim 1, wherein the high level of lighting power is greater than or equal to 150% of the low level.

4. The lighting module according to claim 1, wherein the second beam has a mean light flux in a zone which is greater than or equal to 150% of the mean light flux of the first beam in the zone, said zone being situated beneath the optical axis.

5. The lighting module according to claim 1, wherein the at least one first light source is arranged to illuminate in a first direction, the at least one second light source being arranged to illuminate in a second direction which is opposite of the first direction.

6. The lighting module according to claim 1, wherein each of the first and second optical systems comprises a reflective surface to reflect rays emitted by the at least one first light source and/or at least one second light source, respectively, toward a cutoff edge situated on the optical axis of the lighting module.

7. The lighting module according to claim 6, wherein the reflective surface of the first and of the second optical system has the shape of a half-shell with an elliptical profile.

8. The lighting module according to claim 6, wherein the reflective surface of the first optical system comprises two portions of a surface of revolution about two optical axes of the first optical system, said axes converging toward the optical axis of the lighting module.

9. The lighting module according to claim 8, wherein said at least one main light zone of each of two first light sources are centered on one of the two optical axes of the first optical system respectively, and said at least one auxiliary light zone is arranged laterally to said corresponding one of the two optical axes on the side of the optical axis of the lighting module and forward of said at least one main light zone.

10. The lighting module according to claim 9, wherein said at least one main light zone of each of the two first light sources are aligned in a first direction perpendicular to said corresponding one of the two optical axes of the first optical system.

11. The lighting module according to claim 10, wherein said at least one auxiliary light zone of each of the two first light sources are aligned in a second direction perpendicular to said corresponding one of the two optical axes of the first optical system, said second direction being forward of the corresponding first direction.

12. The lighting module according to claim 1, comprising an electronic control unit controlling the at least one first light source and the at least one second light source, and configured to power the at least one first light source at the low level to form the first beam and to power the at least one second light source at the high level to form the second beam.

13. The lighting module according to claim 1, wherein the at least one first light source includes two light sources, arranged respectively one on each side of the optical axis of the lighting module.

14. The lighting module according to claim 1, comprising a lens to receive rays of light from the first and second optical systems to form the first and second beams.

15. A motor vehicle lighting module, comprising:
   an optical axis;
   a first optical system with at least one first light source, said first optical system being configured to form a first lighting beam along the optical axis, with a horizontal cutoff;
   a second optical system with at least one second light source, said second optical system being configured to produce, in combination with the first optical system, a second lighting beam along the optical axis, that is vertically more extensive than the first beam;
   wherein-the at least one first light source has a variable lighting power varying between a high level and a low level and the at least one second light source has a lighting power at the high level, the first beam being produced at the low level of lighting power and the second beam being produced at the high level,
   wherein the at least one first light source comprises at least one main light zone and at least one auxiliary light zone, said at least one main light zone and said at least one auxiliary light zone to be electrically powered separately, the low level of lighting power being produced by only powering said at least one main light zone and the high level of power being produced by powering said at least one main light zone and said at least one auxiliary light zone, and the high level of the at least one first light source increases light intensity at the horizontal cutoff.

16. The lighting module according to claim 15, wherein the at least one first light source and the at least one second light source are arranged on opposite faces of a common support.

* * * * *